(12) United States Patent
Wittenberg

(10) Patent No.: US 11,002,971 B1
(45) Date of Patent: May 11, 2021

(54) DISPLAY DEVICE WITH MECHANICALLY ADJUSTABLE OPTICAL COMBINER

(71) Applicant: Apple Inc., Cupertino, CA (US)

(72) Inventor: Michael B. Wittenberg, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 25 days.

(21) Appl. No.: 16/503,847

(22) Filed: Jul. 5, 2019

Related U.S. Application Data

(60) Provisional application No. 62/722,710, filed on Aug. 24, 2018.

(51) Int. Cl.
*G02B 27/01* (2006.01)

(52) U.S. Cl.
CPC ..... *G02B 27/0172* (2013.01); *G02B 27/0176* (2013.01)

(58) Field of Classification Search
CPC .......... G02B 27/0172; G02B 27/0176
See application file for complete search history.

(56) References Cited

U.S. PATENT DOCUMENTS

| | | | |
|---|---|---|---|
| 9,292,973 B2 | 3/2016 | Bar-Zeev et al. | |
| 10,255,726 B2* | 4/2019 | Skidmore | G06F 3/0304 |
| 10,354,350 B2* | 7/2019 | Nakfour | G06Q 50/265 |
| 2002/0080094 A1* | 6/2002 | Biocca | H04N 13/344 |
| | | | 345/8 |
| 2002/0196202 A1* | 12/2002 | Bastian | G06T 19/006 |
| | | | 345/8 |
| 2007/0181129 A1* | 8/2007 | Martinson | A62B 9/006 |
| | | | 128/206.21 |
| 2010/0157400 A1* | 6/2010 | Dimov | G02B 5/188 |
| | | | 359/13 |
| 2011/0075257 A1* | 3/2011 | Hua | H04N 13/383 |
| | | | 359/464 |
| 2011/0221656 A1 | 9/2011 | Haddick et al. | |
| 2012/0127062 A1 | 5/2012 | Bar-Zeev et al. | |
| 2012/0147156 A1 | 6/2012 | Aizawa | |
| 2013/0050432 A1 | 2/2013 | Perez et al. | |
| 2013/0050833 A1* | 2/2013 | Lewis | A61B 3/111 |
| | | | 359/630 |
| 2014/0177023 A1* | 6/2014 | Gao | G02B 25/001 |
| | | | 359/238 |
| 2016/0041406 A1 | 2/2016 | Ramirez Flores et al. | |

(Continued)

*Primary Examiner* — Sejoon Ahn
(74) *Attorney, Agent, or Firm* — Treyz Law Group, P.C.; G. Victor Treyz; Matthew R. Williams

(57) ABSTRACT

An optical system may include a head-mounted support structure configured to receive a removable portable electronic device with a display to form a head-mounted device. A head-mounted device may also be formed by incorporating a non-removable display into a head-mounted support structure. An optical combiner may be coupled to the head-mounted support structure. During operation of the head-mounted device, real-world image light passes through the optical combiner to eye boxes in which the eyes of a user are located. Display image light from the display reflects from a curved partially reflective surface of the optical combiner towards the eye boxes. To make optical adjustments such as virtual image distance adjustments, one or more actuators may be used to mechanically adjust the optical combiner.

21 Claims, 8 Drawing Sheets

(56) References Cited

U.S. PATENT DOCUMENTS

| | | | |
|---|---|---|---|
| 2016/0091729 A1* | 3/2016 | Ollila | H04N 5/2253 |
| | | | 348/208.99 |
| 2016/0180591 A1* | 6/2016 | Shiu | G06F 3/013 |
| | | | 345/633 |
| 2016/0377867 A1* | 12/2016 | Kessler | G02B 5/3083 |
| | | | 359/482 |
| 2018/0157051 A1* | 6/2018 | Sahlsten | G02B 27/145 |
| 2018/0293752 A1* | 10/2018 | Ninan | G06F 3/011 |
| 2019/0004350 A1* | 1/2019 | Sahlsten | G02B 27/28 |

* cited by examiner

DISPLAY DEVICE WITH MECHANICALLY ADJUSTABLE OPTICAL COMBINER

This application claims the benefit of provisional patent application No. 62/722,710, filed Aug. 24, 2018, which is hereby incorporated by reference herein in its entirety.

FIELD

This relates generally to optical systems, and, more particularly, to optical systems with optical combiners.

BACKGROUND

Optical systems may be used to provide images to a viewer. In some optical systems, it is desirable for both computer-generated and real-world images to be viewed simultaneously. In this type of system, an optical combiner can be used to merge image light from a display with real-world image light. If care is not taken, however, the optical combiner will not exhibit desired optical characteristics. This can make it difficult to satisfactorily provide content to the viewer.

SUMMARY

A system may include a head-mounted support structure configured to receive a removable portable electronic device to form a head-mounted device. The removable portable electronic device may be a cellular telephone or other device with a display. A head-mounted device may also be formed by incorporating a non-removable display into a head-mounted support structure.

To provide a user with the ability to view mixed reality content, the head-mounted device may be provided with an optical combiner. The optical combiner may be formed from a transparent substrate layer with a coating that is partially reflective and partially transparent. The optical combiner may be coupled to the head-mounted support structure in a location that overlaps left and right eye boxes. When the head-mounted device is worn on the user's head, the left and right eyes of a user are located in the left and right eye boxes.

During operation of the head-mounted device, real-world image light from external objects pass through the optical combiner to eye boxes. At the same time, display image light that is produced by the display reflects from the optical combiner towards the eye boxes. This allows the user to view computer-generated content on the display overlaid on top of the real world.

The optical combiner may have a curved surface (a surface with a curved cross-sectional profile) such as a curved surface with compound curvature (Gaussian curvature) that forms a mirror lens (sometimes referred to as a free-form mirror lens). Display image light from the display of the removable portable device reflects from the mirror lens of the optical combiner towards the eye boxes. The lens function of the optical combiner helps focus light from the display for viewing by the user's eyes in the left and right eye boxes. The display light may be used in overlaying virtual images on real-world objects.

To adjust the position of virtual images (sometimes referred to as the virtual image distance) and/or to adjust the direction in which reflected display light is traveling, one or more actuators may be used to perform mechanical adjustments to the optical combiner. For example, the optical combiner may be moved towards the eye boxes (and/or increased in curvature), which provides additional lens power and shortens the virtual image distance, or the optical combiner may be moved away from the eye boxes (and/or decreased in curvature), which provides less lens power and lengthens the virtual image distance.

DETAILED DESCRIPTION

Optical systems may be used to present images to a user. In some mixed reality systems, displays present computer-generated content that is overlaid on top of real-world images. An optical system may use an optical combiner to combine real-world image light with image light from a display. The optical combiner may be a curved partially reflective mirror that is mounted in front of a user's eyes using head-mounted support structures. The head-mounted support structures may be configured to form a head-mounted device that is worn on the head of a user. In some arrangements, the head-mounted device may include a non-removable display. In other arrangements, the head-mounted device may be configured to receive a removable portable electronic device with a display such as a removable cellular telephone.

During operation, one or more actuators may be used to mechanically adjust the optical combiner. The optical combiner may, for example, be tilted about a hinge axis, rotated around a pivot point, flexed to provide the optical combiner with a desired amount of curvature, and/or may otherwise be mechanically adjusted in shape and/or location. These mechanical adjustments may adjust the focal length of a reflective lens formed from the optical combiner, may steer reflected image light, and/or may otherwise be used in enhancing the ability of users to view content while using a head-mounted device that contains the optical combiner. For example, actuator movements of the optical combiner (tilting, rotating, bending, bowing, etc.) may be used in adjusting the lens power associated with the mirror lens that is formed from the partially reflective coating on the optical combiner and thereby adjusting virtual image distances associated with computer-generated objects being overlaid on the real world.

Figure 1:
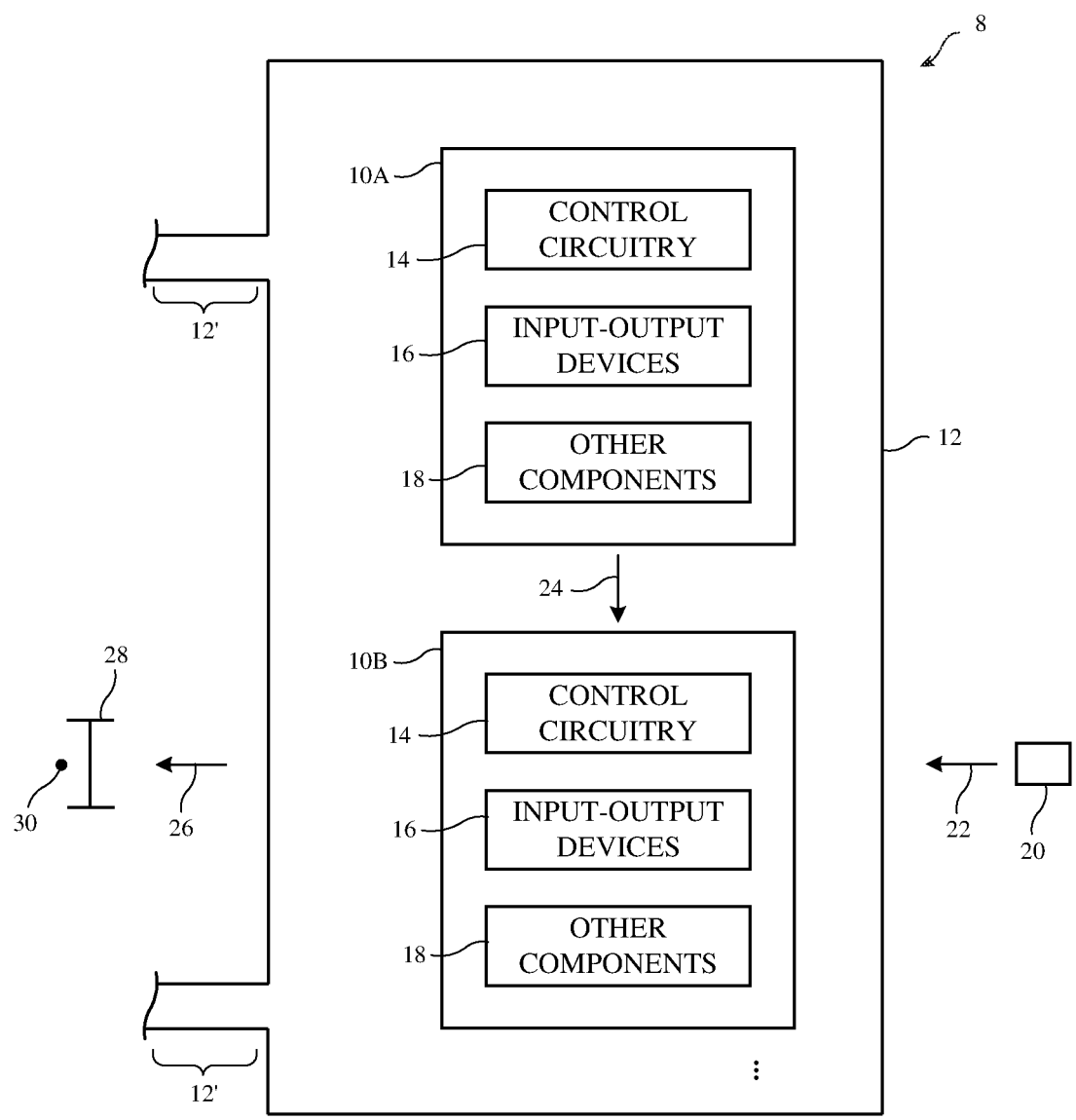
FIG. 1 is a diagram of an illustrative optical system in accordance with an embodiment.

An illustrative optical system with a head-mounted device is shown in FIG. 1. As shown in FIG. 1, optical system 8 may include equipment 10A and 10B. Equipment 10A may be, for example, a portable electronic device such as a cellular telephone. Equipment 10B may be a head-mounted device with an optical combiner. In some configurations, the components of equipment 10A and 10B may be formed as an integral unit. In other configurations, equipment 10B may be incorporated into a support structure for equipment 10A and equipment 10A may be removable equipment such as a removable cellular telephone or other removable portable electronic device. With this type of arrangement, equipment 10A may be used in conjunction with equipment 10B to form a head-mounted display or may be used separately. Configurations for system 8 in which system 8 includes removable equipment 10A may sometimes be described herein as an example.

In the illustrative arrangement of FIG. 1, system 8 includes a head-mounted support structure such as support structure 12. Support structure 12 may be formed from glass, polymer, metal, fabric, natural materials, ceramic, and/or other materials. Support structure 12 may be configured to be worn on the head of a user. For example, support structure 12 may include portions 12' that are configured to form straps, helmet support structures, portions of a hat, goggles, or glasses, etc. Support structures 12 may also include housing walls, internal supports, and/or other structures for supporting and housing the components of the head-mounted device.

Head-mounted support structure 12 may be formed as part of equipment 10B and may be configured to receive equipment 10A when it is desired to support equipment 10A during use of system 8 (e.g., when equipment 10A and 10B are coupled to form a head-mounted display device). Head-mounted support structure 12 may, as an example, have portions forming a recess that receives equipment 10A and holds equipment 10A in place while equipment 10A is presenting computer-generated images on a display in equipment 10A.

Equipment 10A and/or 10B may include components such as control circuitry 14, input-output devices 16, and other components 18. Control circuitry 14 may include storage such as hard-disk storage, volatile and non-volatile memory, electrically programmable storage for forming a solid-state drive, and other memory. Control circuitry 14 may also include one or more microprocessors, microcontrollers, digital signal processors, graphics processors, baseband processors, application-specific integrated circuits, and other processing circuitry. Communications circuits in circuitry 14 may be used to transmit and receive data (e.g., wirelessly and/or over wired paths). This allows equipment 10A and 10B to communicate wirelessly and/or over a wired connection between equipment 10A and 10B. The communications circuits of circuitry 14 may also be used to support wired and/or wireless circuitry with external equipment (e.g., remote controls, host computers, on-line content servers, etc.).

In some arrangements, control circuitry 14 in equipment 10A and/or 10B may use a display in equipment 10A to display images. These images, which may sometimes be referred to as computer-generated content or computer-generated images, may be associated with a virtual world, may include pre-recorded video for a movie or other media, or may include other images. Image light 24 (display image light) from computer-generated images in equipment 10A may be provided to equipment 10B (e.g., through free space). Equipment 10B may include an optical combiner. The optical combiner may combine real-world image light 22 associated with real-world images of real-world objects 20 with display image light 24 associated with computer-generated (non-real-world) images, thereby producing merged image light 26 for viewing by viewer (viewer eye) 30 in eye box 28. System 8 may have two associated eye boxes 28 for providing images to a user's left and right eyes.

Input-output devices 16 in equipment 10A and/or 10B may be coupled to control circuitry 14 in equipment 10A and/or 10B. Input-output devices 16 may be used to gather user input from a user, may be used to make measurements on the environment surrounding device 10, may be used to provide output to a user, and/or may be used to supply output to external electronic equipment. Input-output devices 16 may include buttons, joysticks, keypads, keyboard keys, touch sensors, track pads, displays, touch screen displays, microphones, speakers, light-emitting diodes and/or lasers for providing a user with visual output, and sensors (e.g., force sensors, temperature sensors, magnetic sensor, accelerometers, gyroscopes, and/or other sensors for measuring orientation, position, and/or movement of system 8, proximity sensors, capacitive touch sensors, strain gauges, gas sensors, pressure sensors, ambient light sensors, and/or other sensors). Devices 16 can include cameras (digital image sensors) for capturing images of the user's surroundings, cameras for performing gaze detection operations by viewing eyes 30, and/or other cameras. For example, input-output devices 16 may include one or more cameras for producing data that is fused with data from an inertial measurement unit having an accelerometer, compass, and/or gyroscope for implementing a visual inertial odometry system. Devices 16 may also include depth sensors (e.g., sensors using structured light and/or using binocular cameras). In some configurations, light-based and/or radio-frequency-based sensors may be used for external object tracking (e.g., lidar, radar, and/or other detection and ranging applications).

Equipment 10A and/or 10B may also include other components 18. Components 18 may include electrically controlled actuators (e.g., motors, electromagnetic linear actuators, piezoelectric actuators, and/or other actuators) for mechanically adjusting an optical combiner in system 8 and/or adjusting other components of system 8. Components 18 may also include batteries for powering the electrical components of equipment 10A and/or 10B, optical components, and/or other devices. If desired, some or all of the components in equipment 10A and/or 10B may be omitted from system 8 (e.g., to simplify system 8 and reduce cost). The configuration of FIG. 1 is illustrative.

To combine display image light 24 from a display in equipment 10A with real-world image light 22 to produce merged light 26, components 18 in equipment 10B may include an optical combiner. The optical combiner may be passive (e.g., a partially reflective mirror combiner having a partial mirror formed from a thin-film layer of metal and/or a thin-film interference filter having a thin-film dielectric stack of polymers and/or inorganic dielectrics of alternating refractive index that forms a thin-film interference filter mirror with a desired reflectivity and transmission) and/or may include one or more optional adjustable components. Optional adjustable optical components in the optical combiner may impart global changes to light 22 (e.g., a global change in light intensity) and/or may be two-dimensional components (e.g., pixelated components) that can impart changes in particular regions of the optical combiner (e.g., localized increases in light absorption). This allows real-world image light 22 to be locally dimmed (as an example) to help reduce external light intensity when virtual objects in image light 24 are being overlaid on portions of a real-world scene.

In illustrative configurations described herein, system 8 includes an optical combiner that has one or more transparent supporting layers such as a transparent polymer substrate layer or a layer of other suitable clear material such as glass substrate layer. The substrate of the optical combiner is covered with one or more coating layers (e.g., partial mirror layer(s)) that are partially transparent and partially reflective. A coating on the substrate of the optical combiner may, as an example, have a light transmission of 10-90%, at least 20%, at least 30%, less than 80%, less than 70%, or other suitable transmission and may have a reflectivity of 10-90%, at least 20%, at least 30%, less than 70%, less than 80%, etc.

Figure 2:
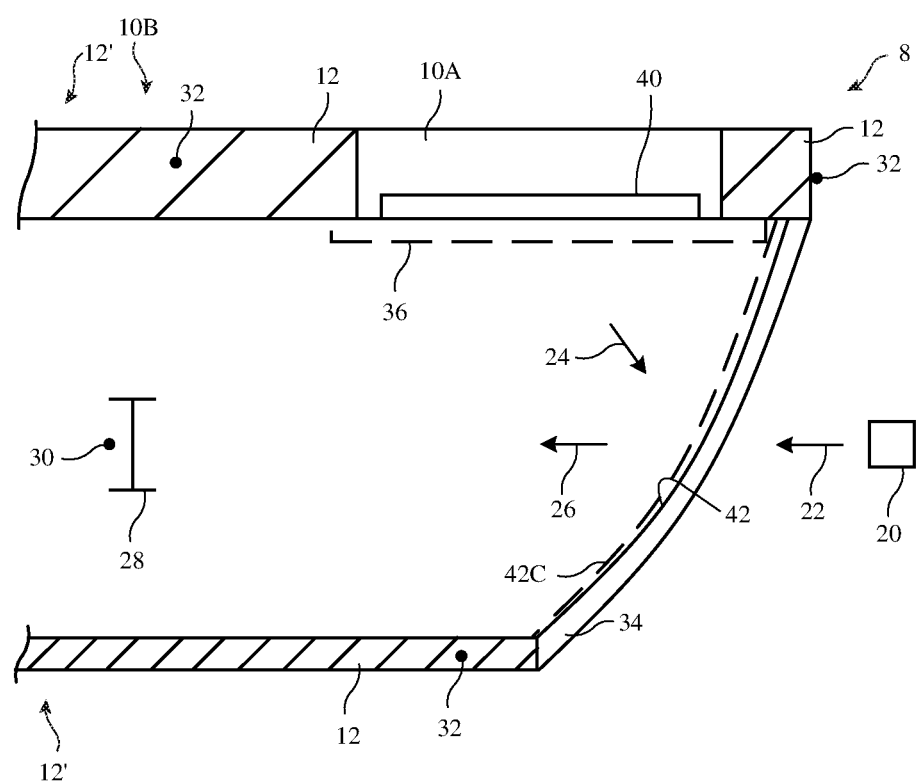
FIG. 2 is a cross-sectional side view of an illustrative optical system in accordance with an embodiment.

A cross-sectional side view of system 8 in an illustrative configuration in which head-mounted support structure 12 (e.g., a housing for equipment 10B) is configured to receive a removable portable electronic device (equipment 10A) is shown in FIG. 2. Equipment 10B includes head-mounted support structure 12 and optical combiner 34. Combiner 34 may have a curved shape (e.g., a curved cross-sectional profile). For example, combiner 34 may have a transparent substrate with a surface such as inner surface 42 that exhibits compound curvature (e.g., surface 42 may be a Gaussian surface). A partially reflective layer such as layer 42C that is formed on surface 42 of the transparent substrate may have a corresponding curved shape. This allows layer 42C to form a partially reflective mirror lens that reflects and focuses light 24 towards eye box 28 and eye 30 for viewing by a user while simultaneously passing real-world image light 22 to eye box 28 and eye 30 without significant distortion so that the user may view real-world objects such as external object 20.

Input-output components 16 (e.g., a gaze tracking system, a front-facing or side-facing camera, a camera in visual odometry circuitry, depth sensors and other sensors, etc.) can be mounted in one or more locations on housing 12 such as locations 32 and may point towards eye 30, external object 20 and/or other external and/or internal directions. Housing 12 may, if desired, have a transparent structure such as optional transparent structure 36 (e.g., a planar layer of glass, transparent polymer, etc.) that receives the front face of equipment 10A (e.g., a removable cellular telephone or other removable portable electronic device) and receives display 40 on the front face of equipment 10A when equipment 10A is received within equipment 10B. One or more coatings or other optical layers may be formed on all or part of a transparent substrate in structure 36 (e.g., to from antireflection coatings, etc.).

Display 40 uses pixels (e.g., an array of pixels) to emit display image light 24 (sometimes referred to as virtual image light or virtual images). External objects such as real world object 20 emit real-world image light. Reflective layer (e.g., coating 42C) is formed on surface 42 of the transparent substrate in optical combiner 34. The transparent substrate may be formed from a glass layer, a polymer layer such as a flexible polymer layer, or other suitable substrate layer(s). Coating 42C may be a partially reflective layer of metal (e.g., a metal thin-film layer) or a partially reflective thin-film interference filter mirror formed from a dielectric stack of materials of different refractive index values. Optical combiner 34 is sufficiently transparent to pass real-world light 22 to eye box 28 while being sufficiently reflective to reflect light 24 from display 40 to eye box 28. During operation of the head-mounted device, real-world image light 22 and display light 24 are combined by combiner 34 and form combined light 26 that is directed toward eye boxes such as eye box 28 of FIG. 2.

Lens surface 42 of optical combiner 34 may not have a desired configuration for reflecting light 24 towards eye box 28. The concave mirror lens formed from surface 42 of optical combiner 34 therefore may not have desired properties for optimal display image viewing. For example, the lens power associated with optical combiner 34 may be different than desired, causing the virtual image distance of the head-mounted device to differ from a desired virtual image distance. As another example, image light 24 may be reflected in a different direction than desired for viewing by the user. For example, if the user's eyes are high on the user's face, light 24 may be reflected to a location on the user's face that is too low and if the user's eyes are low on the user's face, light 24 may be reflected towards a location on the user's face that is too high.

During operation of system 8, control circuitry 14 may use one or more actuators to mechanically adjust optical combiner 32 and thereby enhance display image viewing for the user (viewer) wearing system 8. The actuator(s) may, for example, adjust lens orientation and/or shape so that the optical power associated with optical combiner 34 changes, thereby shifting the location of virtual images (computer-generated content) being overlaid on real-world objects.

Figure 3:
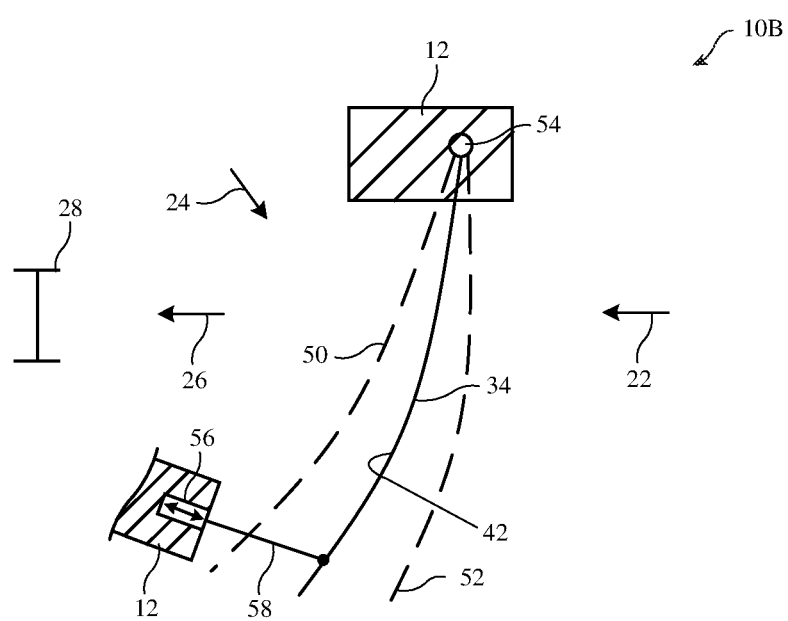
FIG. 3 is a cross-sectional side view of an illustrative optical combiner (coupler) and an associated actuator along an edge of the combiner that is configured to move the optical combiner in accordance with an embodiment.

Consider, as an example, the illustrative arrangement of FIG. 3. As shown in FIG. 3, optical combiner 34 may be mechanically adjusted using actuator 56. Actuator 56 may be coupled to optical combiner 34 using coupling structure 58 (e.g., one or more cables or other pull elements and/or rigid rods or other push-pull coupling structures). Coupling structure 58 may be configured to avoid creating visual obstructions for the user. The housing of actuator 56 may be coupled to a portion of support structure 12. For example, actuator 56 may be mounted to housing 12 using fasteners, adhesive, brackets, clips, and/or other coupling mechanisms. When it is desired to adjust the orientation of optical combiner 34, control circuitry 14 may control actuator 56 use coupling structure 58 to pull against the lower edge of optical combiner 34 while the opposing upper edge of optical combiner 34 rotates relative to support structure 12 using hinge 54. In this way, optical combiner 34 is moved inwardly towards eye box 28 (e.g., to illustrative position 50, which may shift the virtual image distance of system 8 outward). When actuator 56 pushes on the lower edge of optical combiner 34, optical combiner 34 is moved outwardly away from eye box 28 (e.g., to illustrative position 52, which may shift the virtual image distance of system 8 inward). In some arrangements, adjustments to the orientation of optical combiner 34 that are made using actuator 56 may be used to direct reflected portions of light 24 towards locations of interest.

Figure 4:
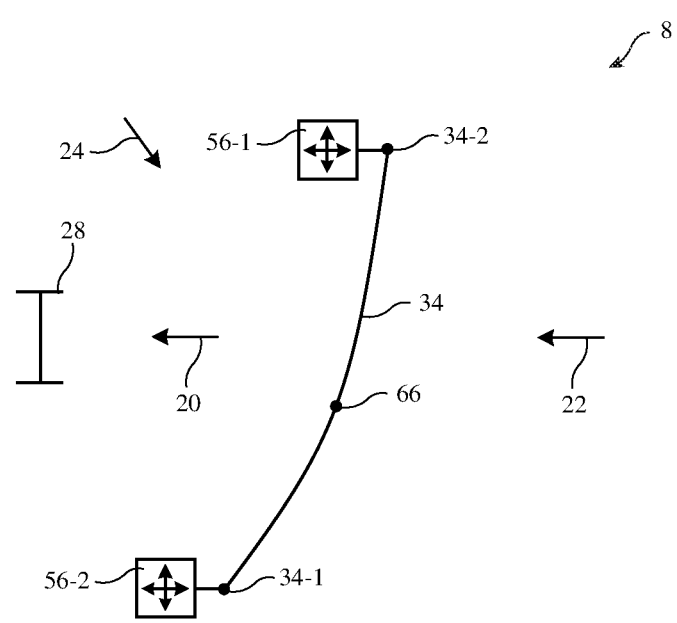
FIG. 4 is a cross-sectional side view of an illustrative optical combiner and associated actuators that may be used to rotate the optical combiner in accordance with an embodiment.

In the example of FIG. 3, hinge 54 is coupled between support structure 12 and the upper edge of optical combiner 34, so that optical combiner 34 can rotate about hinge 54 while moving towards or away from eye boxes 28. In the illustrative example of FIG. 4, the actuator circuitry used in adjusting optical combiner 34 has two portions. First actuator 56-1 is coupled to upper edge 34-2 of optical combiner 34 and second actuator 56-2 is coupled to lower edge of optical combiner 34. Control circuitry 14 may control the first and second actuators to rotate optical combiner 34 about an axis of rotation such as axis 66 (which extends into the page in FIG. 4) and/or to translate optical combiner 34 toward or away from eye box 28. For example, when it is desired to move optical combiner 34 away from eye box 28, actuators 56-1 and 56-1 may simultaneously push optical combiner 34 away from eye box 28 and when it is desired to move optical combiner 34 towards eye box 28, actuators 56-1 and 56-2 may simultaneously pull optical combiner 34 toward eye box 28. Arrangements in which actuators 56-1 and 56-2 rotate optical combiner 34 while translating optical combiner 34 (e.g., to adjust virtual image distance) may also be used.

Figure 5:
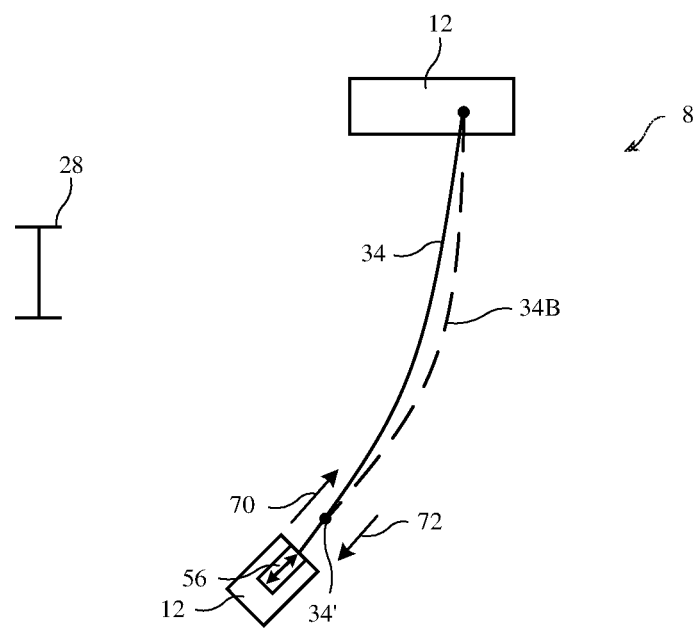
FIG. 5 is a cross-sectional side view of an illustrative optical combiner with an associated actuator that is configured to bow the combiner outward and thereby change the curvature and lens power associated with the combiner in accordance with an embodiment.

FIG. 5 shows how optical combiner 34 may be made of a flexible substrate material (e.g., a thin bendable layer of polymer). Actuator 56 can apply pressure to lower edge 34' of optical combiner 34 by pushing on combiner 34 in direction 70, thereby causing optical combiner 34 to bow outwardly (away from eye box 28). This changes the lens power of the mirror lens formed from the partially reflective mirror coating on optical combiner 34 (e.g., to adjust virtual image distance). In scenarios in which it is desired to flatten optical combiner 34 (e.g., when it is desired to reduce the curvature of combiner 34 and weaken the lens power of the mirror lens), actuator 56 can move lower edge 34' towards actuator 56 by pulling on combiner 34 in direction 72. By increasing or decreasing the amount of bow (the amount of curvature) in optical combiner 34 using actuator 56, a desired optical characteristic for optical combiner 34 may be achieved (e.g., to adjust virtual image distance).

Figure 6:
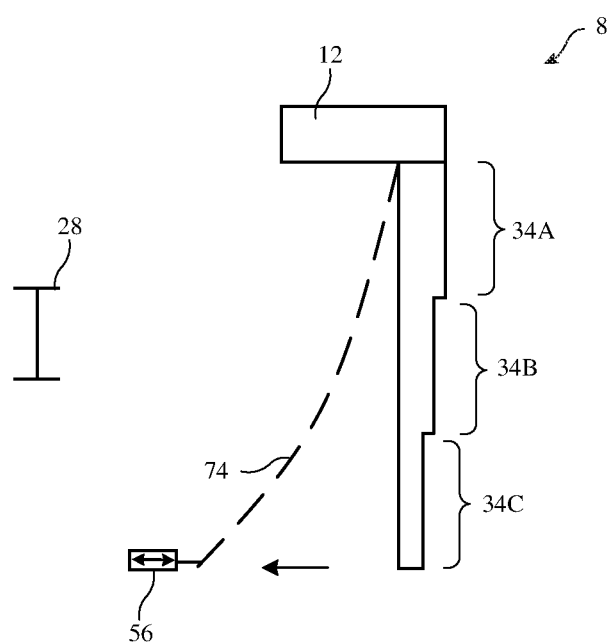
FIG. 6 is a cross-sectional side view of an illustrative optical combiner with an associated actuator that is configured to bend the combiner in accordance with an embodiment.

As shown in FIG. 6, optical combiner 34 may, if desired, have different regions with different flexibility (e.g., different flexibility due to material of different thicknesses and/or material with different stiffness values due to differences in material composition or other differences). Optical combiner 34 may, as an example, be formed from a flexible polymer layer with that has a first thickness in upper portion 34A (and/or first material in portion 34A), a second thickness that is less than the first thickness in middle portion 34B (and/or second material in portion 34B), and a third thickness that is less than the second thickness in lower portion 34C (and/or a third material in portion 34C). When actuator 56 moves lower edge 34-1 of optical combiner 34 towards eye box 60, the optical combiner portion 34B will flex more than portion 34A and portion 34C will flex more than portion 34B, as illustrated by bent combiner profile 74. This type of cross-sectional bend profile for combiner 34 may be used to create a mirror lens with different curvature (and different lens power) in different areas of the lens (e.g., to implement a bifocal effect for virtual content).

Figure 7:
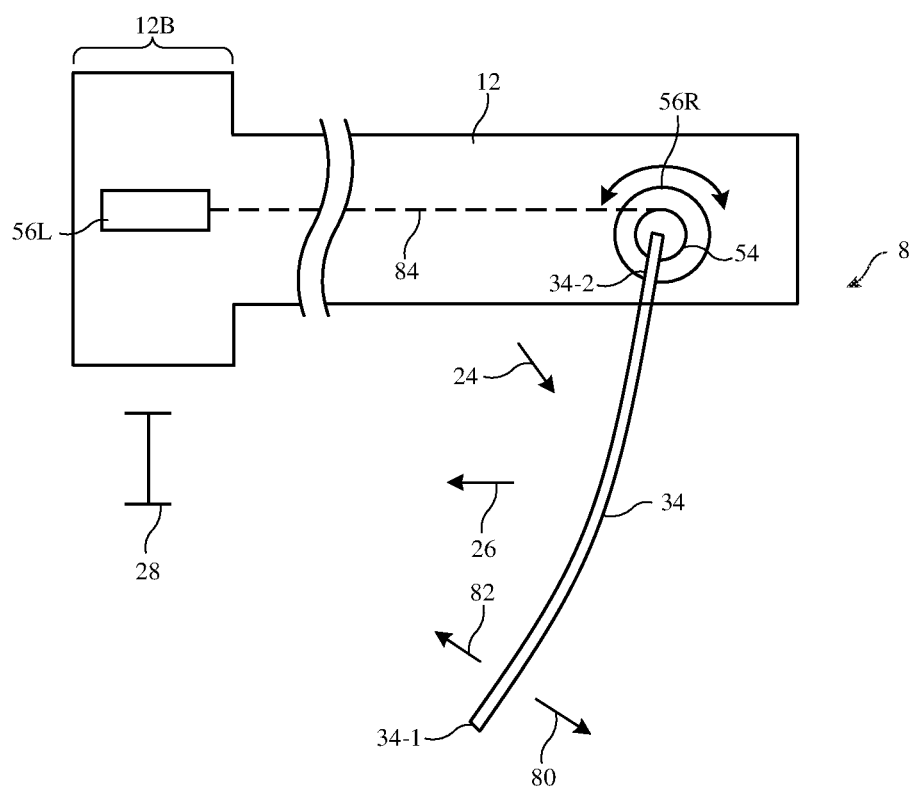
FIG. 7 is a cross-sectional side view of an illustrative optical combiner and an associated rotating system coupled to a hinge that is used to rotate the optical combiner in accordance with an embodiment.

As shown in FIG. 7, optical combiner 34 may be positioned using a rotational actuator such as actuator 56R (e.g., a motor or other rotatable positioner). Upper edge 34-2 of optical combiner 34 may be coupled to hinge 54, so that optical combiner 34 can be rotated about hinge 54 in outward direction 80 away from eye box 28 and in inward direction 82 towards eye box 28 using actuator 56R (e.g., to adjust virtual image distance). If desired, an actuator such as linear actuator 56L may be mounted in a portion of support structures 12 that is not immediately adjacent to hinge 54. A coupler such as coupling structure 84 may be used to translate linear actuation from actuator 56L into rotational actuation (torque) on upper edge 34-2 of optical combiner 34 at hinge 54. The coupling structures that are used to couple actuators in system 8 to optical combiner 34 may include push-pull coupling members (e.g., solid structures of metal, polymer, and/or other materials), and/or pull-type coupling structures (e.g., flexible strands of material). If desired, springs and other non-motorized actuating structures may be incorporated into the actuating system and coupling structures used to couple actuators in system 8 to optical combiners 34. In general, any suitable type of actuator (linear, rotational, etc.) may be used to rotate optical combiner 34 about hinge 54. Hinge 54 of FIG. 7 is located at the upper edge of optical combiner 34. If desired, hinges or other pivot structures may be coupled between other portions of combiner 34 and support structure 12.

Figure 8:
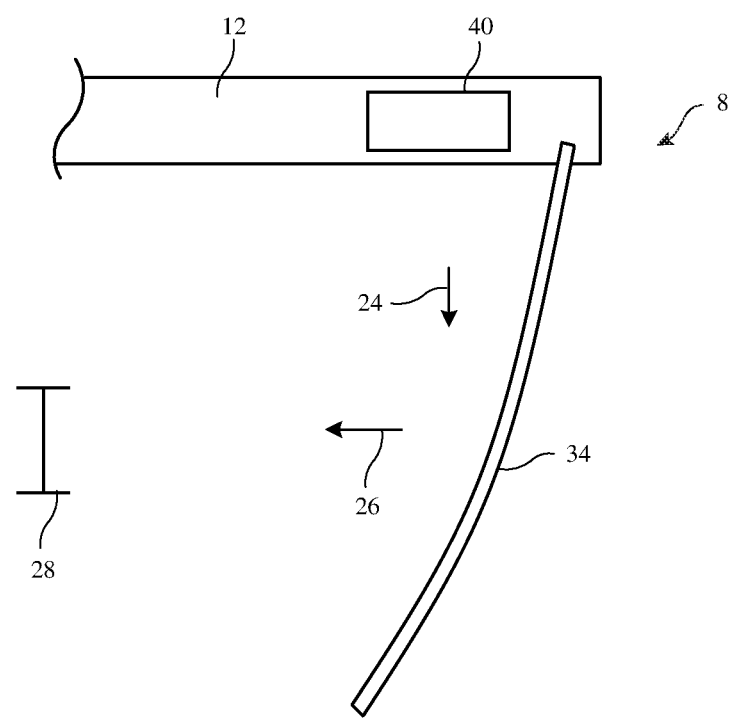
FIG. 8 is a cross-sectional side view of an illustrative optical combiner and associated non-removable display in an illustrative device in accordance with an embodiment.

FIG. 8 is a side view of system 8 in an illustrative configuration in which display 40 has been integrated into support structure 12. In this type of arrangement, display 40 is a non-removable display that is coupled to head-mounted support structure 12 to form a head-mounted device. Because display 40 is mounted within the head-mounted device, support structure 12 need not be configured to receive removable electronic device 10A. Images to be displayed on display 40 may be provided to control circuitry in the head-mounted device from internal storage processing circuits and/or from external equipment. For example, external equipment such as a cellular telephone, computer, etc. may convey still and/or moving images to the head-mounted device to display on display 40. Optical combiner 34 of FIG. 8, which is used in conveying images from display 40 to eye box 28, may be mechanically adjusted (e.g., to adjust virtual image distance) using one or more actuators as described in connection with FIGS. 2, 3, 4, 5, 6, and 7 and/or using other suitable mechanical adjustment arrangements.

As described above, one aspect of the present technology is the gathering and use of gaze tracking information and other user information. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, facial information, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. A head-mounted device configured to receive real-world image light from real-world objects and operable with a removable portable electronic device that has a display, comprising:
   a head-mounted support structure configured to receive the removable portable electronic device; and
   an optical combiner configured to combine the real-world image light with display image light produced by the display when the removable portable electronic device is received within the head-mounted support structure;
   an actuator coupled to the optical combiner; and
   control circuitry configured to use the actuator to mechanically adjust the optical combiner.

2. The head-mounted device defined in claim 1 wherein the optical combiner comprises a partially reflective mirror that is configured to pass the real-world image light to an eye box, wherein the partially reflective mirror is configured to reflect the display image light to the eye box, and wherein the control circuitry is configured to tilt the optical combiner using the actuator.

3. The head-mounted device defined in claim 2 further comprising a hinge coupled to the head-mounted support structure, wherein the optical combiner has first and second opposing edges, wherein the first edge is coupled to the hinge, and wherein the actuator is configured to rotate the optical combiner about the hinge by moving the second edge.

4. The head-mounted device defined in claim 3 wherein the actuator is coupled to the second edge by a coupling structure and is configured to pull the second edge and to push the second edge.

5. The head-mounted device defined in claim 3 wherein the actuator is coupled to the first edge and is configured to apply torque to the first edge to rotate the optical combiner about the hinge.

6. The head-mounted device defined in claim 1 wherein the optical combiner comprises a flexible transparent layer and wherein the control circuitry is configured to bow the flexible transparent layer by pushing against an edge of the optical combiner with the actuator.

7. The head-mounted device defined in claim 1 wherein the optical combiner comprises a flexible transparent layer having different thickness in different respective regions.

8. A head-mounted device, comprising:
   a head-mounted support structure;
   a display coupled to the head-mounted support structure;
   an optical combiner having first and second opposing curved surfaces, wherein the optical combiner is configured to pass real-world image light through the first surface to an eye box and is configured to reflect a display image on the display off the second surface in a direction towards the eye box;
   an actuator; and
   control circuitry configured to adjust the optical combiner with the actuator.

9. The head-mounted device defined in claim 8 wherein the control is configured to tilt the optical combiner with the actuator.

10. The head-mounted device defined in claim 8 further comprising a hinge that is coupled to the head-mounted support structure and that is coupled to an edge of the optical combiner, wherein the control circuitry is configured to rotate the optical combiner about the hinge using the actuator.

11. The head-mounted device defined in claim 10 wherein the optical combiner comprises a flexible polymer layer and wherein the control circuitry is configured to bend the flexile polymer layer using the actuator.

12. The head-mounted device defined in claim 8 wherein the optical combiner comprises a flexible polymer layer and wherein the control circuitry is configured to use the actuator to bow the flexible polymer layer away from the eye box.

13. The head-mounted device defined in claim 8 further comprising an additional actuator, wherein the optical combiner has opposing first and second edges, wherein the actuator is coupled to the first edge, and wherein the additional actuator is coupled to the second edge.

14. A head-mounted device, comprising:
  a head-mounted support structure configured to receive a removable cellular telephone with a display; and
  an optical combiner configured to pass real-world image light from a real-world object to an eye box and configured to reflect display light from the display to the eye box;
  an actuator; and
  control circuitry configured to use the actuator to move the optical combiner.

15. The head-mounted device defined in claim 14 wherein the optical combiner has an edge and wherein the actuator is configured to push and pull on the edge.

16. The head-mounted device defined in claim 15 wherein the optical combiner comprises a transparent substrate coated with a partially reflective coating.

17. The head-mounted device defined in claim 16 wherein the partially reflective coating comprises a metal layer.

18. The head-mounted device defined in claim 16 wherein the partially reflective coating comprises a thin-film interference filter mirror.

19. The head-mounted device defined in claim 14 wherein the optical combiner has a first edge coupled to the head-mounted support structure and an opposing second edge coupled to the actuator and wherein the actuator is configured to move the optical combiner by pulling on the second edge.

20. The head-mounted device defined in claim 19 wherein the optical combiner has a first edge coupled to the head-mounted support structure and an opposing second edge coupled to the actuator and wherein the actuator is configured to bow the optical combiner outward away from the eye box by pushing on the second edge.

21. The head-mounted device defined in claim 8, wherein the first and second surfaces are curved in the same direction.

* * * * *